United States Patent
Galati et al.

(10) Patent No.: US 11,199,360 B2
(45) Date of Patent: Dec. 14, 2021

(54) PLANT AND METHOD FOR RECOVERING METALS AND/OR METAL OXIDES FROM INDUSTRIAL PROCESS WASTE, IN PARTICULAR REFINERY WASTE

(71) Applicant: SAIPEM S.p.A., San Donato Milanese (IT)

(72) Inventors: Rosario Galati, Pogliano Milanese (IT); Lorenzo Bruno, San Donato Milanese (IT); Lino Carlessi, Dalmine (IT)

(73) Assignee: SAIPEM S.P.A., San Donato Milanese (IT)

( * ) Notice: Subject to any disclaimer, the term of this patent is extended or adjusted under 35 U.S.C. 154(b) by 612 days.

(21) Appl. No.: 15/546,580

(22) PCT Filed: Feb. 5, 2016

(86) PCT No.: PCT/IB2016/050606
§ 371 (c)(1),
(2) Date: Jul. 26, 2017

(87) PCT Pub. No.: WO2016/125115
PCT Pub. Date: Aug. 11, 2016

(65) Prior Publication Data
US 2018/0017327 A1 Jan. 18, 2018

(30) Foreign Application Priority Data
Feb. 6, 2015 (IT) .......................... MI2015A000163

(51) Int. Cl.
*F27B 9/24* (2006.01)
*C22B 34/34* (2006.01)
(Continued)

(52) U.S. Cl.
CPC .............. *F27B 9/243* (2013.01); *C22B 1/005* (2013.01); *C22B 7/001* (2013.01); *C22B 7/006* (2013.01);
(Continued)

(58) Field of Classification Search
None
See application file for complete search history.

(56) References Cited

U.S. PATENT DOCUMENTS

| 3,318,590 A | 5/1967 | Winterling |
| 3,883,294 A | 5/1975 | Ritzmann et al. |

(Continued)

FOREIGN PATENT DOCUMENTS

| EP | 0 771 881 A1 | 5/1997 |
| GB | 1 206 421 | 9/1970 |

OTHER PUBLICATIONS

Notification Concerning Submission, Obtention or Transmittal of Priority Document for International Application No. PCT/IB2016/050606 dated May 3, 2016.

(Continued)

*Primary Examiner* — Lois L Zheng
(74) *Attorney, Agent, or Firm* — Neal, Gerber & Eisenberg LLP

(57) ABSTRACT

A plant for recovering metals and/or metal oxides from industrial process waste, in particular oil product refining waste, comprises a furnace; a feed line connected to a main inlet of the furnace and configured to feed the furnace with a solid waste containing metals, in particular in oxide form; an outlet line, connected to a solid phase outlet of the furnace and configured to draw a metal-enriched solid phase out of the furnace; the furnace is a belt conveyor furnace having a belt conveyor closed in a loop with a substantially horizontal configuration and having a top face, which receives the (Continued)

waste to treat and conveys it between two longitudinal opposite ends of the belt conveyor furnace respectively provided with the main inlet and the solid phase outlet.

28 Claims, 5 Drawing Sheets

(51) Int. Cl.
F27D 17/00 (2006.01)
C22B 1/00 (2006.01)
C22B 7/00 (2006.01)
F27B 9/30 (2006.01)
C22B 23/02 (2006.01)
C22B 3/00 (2006.01)
C22B 34/22 (2006.01)
F23G 5/00 (2006.01)
F27B 9/39 (2006.01)
F27B 9/00 (2006.01)

(52) U.S. Cl.
CPC ........ *C22B 23/021* (2013.01); *C22B 23/0407* (2013.01); *C22B 34/22* (2013.01); *C22B 34/34* (2013.01); *F23G 5/006* (2013.01); *F27B 9/30* (2013.01); *F27B 9/39* (2013.01); *F27D 17/001* (2013.01); *F27D 17/008* (2013.01); *F23G 2203/801* (2013.01); *Y02P 10/20* (2015.11)

(56) References Cited

U.S. PATENT DOCUMENTS 4,784,603 A * 11/1988 Robak, Jr. ................ C10J 3/002
110/222
4,861,565 A 8/1989 Sefton et al.
5,702,500 A * 12/1997 Llanos .................... B01J 23/94
423/133
2011/0308353 A1* 12/2011 Hendrickson ......... C21B 13/008
75/528

OTHER PUBLICATIONS

International Search Report and Written Opinion for International Application No. PCT/IB2016/050606 dated Jun. 6, 2016.

\* cited by examiner

PLANT AND METHOD FOR RECOVERING METALS AND/OR METAL OXIDES FROM INDUSTRIAL PROCESS WASTE, IN PARTICULAR REFINERY WASTE

PRIORITY CLAIM

This application is a national stage application of PCT/IB2016/050606, filed on Feb. 5, 2016, which claims the benefit of and priority to Italian Patent Application No. MI2015A000163, filed on Feb. 6, 2015, the entire contents of which are each incorporated by reference herein.

TECHNICAL FIELD

The present disclosure relates to a plant and a method for recovering metals and/or metal oxides from industrial process waste, in particular waste from refining oil products (refinery waste).

BACKGROUND

Various industrial processes produce waste containing metals (typically, but not exclusively, in the form of oxides).

For example, various waste from oil product refining processes contains metals and metal oxides such as in particular: ash resulting from gasification processes; ash resulting from combustion processes of pet coke and/or heavy refining waste; purge discharges of hydro-conversion refining processes of by-products using slurry technology, such as the processes named: EST Slurry Technology (ENI); VRSH technique (Chevron-Lummus-Global); HDH and HDHPLUS techniques (Intevep); SRC-Unifex technique (UOP), (HC)3 technique (Head Waters).

Refinery waste generally contains high concentrations of precious heavy metals such as Ni, V, Mo, typically in the form of oxides. These metals are widely used in the metal industry and in the production of catalysts and, given their continuous increase in price, their recovery may prove of interest and economically worthwhile.

The methods currently available for the recovery of the metals indicated (Ni, V, Mo) from their oxides, essentially based on leaching techniques, require a carbon content not exceeding 5%, but refinery waste, in particular that resulting from the processes mentioned above (gasification, pet coke combustion and heavy refining waste, hydroconversion using slurry technology) have a high carbon content in the form of coke and hydrocarbons. A preliminary treatment is therefore needed for the removal of carbon (as well as the moisture and hydrocarbons), generally performed by incinerators, namely:
  a) Multiple Heart Furnace (MHF),
  b) Rotary Kilns,
  c) Fluidized Bed Combustor (FBC).

These systems have several drawbacks, mainly related to poor temperature control.

For example, at temperatures above 650° C. problems of metal sublimation, the formation of carbonyls and agglomeration of metal oxides arise due to the formation of low melting point eutectics; the combustion waste is thus in an unsuitable form for subsequent treatment to recover the metals.

The multiple heart furnaces and rotary kilns have additional drawbacks, such as:
  refractory corrosion phenomena due to the movement of the product to be incinerated;
  non-uniform particle size of the resulting product, due to non-uniform combustion; and
  high consumption of fuel for the back-up burners and high flows of combustion gas due to the low solid and gas/air exchange efficiency.

The fluidized bed combustors have in turn several drawbacks, mainly due to their complexity; also, to prevent jamming, an inert substance or limestone must be added to the fluidized bed which thus pollutes the metal oxides produced.

Even the subsequent leaching (for the separation of the metals from the oxides) has drawbacks, mainly due to the quality of the outgoing products from incinerators of the type mentioned.

For example, in the case of recovery of vanadium, the leaching processes of the mixture of metal oxides, which can be performed with alkalis or acids, are problematic due to the properties of the solid exiting from the incinerators and require a high consumption of chemicals; also it is sometimes necessary to go through various stages for the separation of vanadium from the other metals. Ultimately, the recovery of vanadium from the metal oxides present in refinery waste presents various difficulties, among which the large amount of carbon present in the oxides and the chemical-physical properties (in particular, the presence of agglomerates), which may make leaching relatively difficult and expensive.

There are even greater difficulties in the case of recovery of molybdenum, which is present in high concentrations especially in process waste with slurry technology conducted with a catalyst (so, for example, in the aforementioned process EST-ENI Slurry Technology), where in particular molybdenum sulphides are used as catalysts; various compounds of molybdenum are found in the sludge of these processes, mixed with nickel and vanadium oxides; the amount of molybdenum may be of the same magnitude as the amount of vanadium.

The recovery of molybdenum also takes place using leaching processes, conducted with alkalis or acids, of the mixture of oxides; in the case of molybdenum its recovery is however more complex than the case of recovering vanadium only, in that the two metals and their compounds have similar characteristics, so that their recovery and their separation is difficult and requires a high consumption of chemicals; moreover, multiple stages of treatment may be required for the separation of the molybdenum from the vanadium and the other metals.

The recovery of molybdenum thus presents problems similar to those of the recovery of vanadium alone, such as the high amount of carbon present in the oxides and the chemical and physical characteristics (presence of agglomerates), which may make leaching difficult and expensive. However the presence of molybdenum makes the recovery process and the separation from vanadium harder since with leaching a solution is generally obtained containing vanadium and molybdenum compounds with similar characteristics.

SUMMARY

It is an advantage of the present disclosure that to provide a plant and a method for the recovery of metals and metal oxides from industrial process waste, particularly waste from refining oil products (refinery waste), which is free of certain of the above-mentioned drawbacks of certain of the prior art.

The present disclosure thus relates to a plant and a method for recovering metals and/or metal oxides from industrial process waste, in particular from waste from refining oil products (refinery waste).

In one such embodiment, the present disclosure relates to a plant configured to recover at least one of a metal and a metal oxide from industrial process waste. The plant includes a belt conveyor furnace including: an inner chamber extending along a substantially horizontal longitudinal axis, and a belt conveyor housed in the inner chamber and closed in a loop with a substantially horizontal configuration along the axis, the belt conveyor including a top face configured to receives a solid waste containing a metal to treat and configured to convey the solid waste along the axis in the inner chamber between a first longitudinal end of the belt conveyor furnace where a main inlet is located and a second, opposite longitudinal end of the belt conveyor furnace where a solid phase outlet is located. The plan includes an inlet line connected to the main inlet of the belt conveyor furnace and configured to feed the belt conveyor furnace with the solid waste. The plan also includes an outlet line connected to the solid phase outlet of the belt conveyor furnace and configured to draw a metal-enriched solid phase out from the belt conveyor furnace.

In another such embodiment, the present disclosure relates to a method for recovering at least one of a metal and a metal oxide from industrial process waste. The method includes spreading a solid waste on a top face of a belt conveyor closed in a loop with a substantially horizontal configuration along an axis, and advancing the belt conveyor along the axis to move the solid waste lying on the belt conveyor along an advance direction defined by the axis while supplying heat to the solid waste to induce a combustion of the solid waste to reduce a carbon content of the solid waste and produce a metal enriched solid phase. The method also includes removing, from the face of the belt conveyor, the metals enriched solid phase, and extracting metals from the metals enriched solid phase.

According to the disclosure, the recovery of metals from refinery waste or from other industrial process waste takes place with the use of a belt conveyor furnace, in which a controlled combustion of the waste to be treated (containing the metals to be recovered) takes place.

The use of a belt conveyor furnace in a recovery process of metals from industrial process waste, particularly from refinery waste, brings a series of advantages compared to certain of the prior art.

First, the use of a belt conveyor furnace makes it possible to perform combustion of the waste to be processed with accurate temperature control, acting on the following parameters:
- flow rate of the solid waste fed to the furnace, and thus by changing the thickness of the solid waste on the belt;
- flow rate of combustion air, and thus by changing the speed of the gas phase inside the furnace; and
- belt speed, and thus by changing the time spent by the solid waste inside the furnace.

The belt conveyor furnace also permits localised temperature control by using a series of burners for low temperature control (acting to raise the temperature if too low) and a series of air and/or water injectors for high temperature control (acting to reduce the temperature if too high), distributed along the longitudinal extension (length) of the furnace.

The use of a belt conveyor furnace then makes it possible to distribute the waste to be processed at the selected thickness, appropriately reduced to limit the time spent in the furnace. Compared to other technologies, the process according to the disclosure thus requires shorter process times.

In addition, the belt conveyor furnace is relatively easily and effectively integrated with various devices complementing the plant, such as in particular: a dryer, a combustor of lightweight components, a pyrolyser and a combustion gas filtration unit.

In particular, the configuration of the belt conveyor furnace makes it possible to place a filtration unit above the furnace, so as to convey (recycle) the dust captured in the filtration unit directly into the furnace.

The belt conveyor furnace configuration also makes it possible to inject into the furnace and thus onto the solid material containing the metals to be recovered, in a simple and effective manner, possible reagents, for example reagents making the product relatively easier to process in the subsequent steps of the recovery process, especially leaching.

In certain embodiments of the disclosure, a solution of sodium carbonate (soda solvay) is injected into the furnace. This way, as well as the combustion of carbon, the reactions between the sodium carbonate and the molybdenum and vanadium oxides take place at a controlled (temperature and time spent in the oxidizing environment) regimen in the furnace, so as to capture $SO_2$ and $SO_3$ and form compounds useful in the subsequent leaching step (able to encourage extraction of the metals, in particular their transition in solution).

Additional features and advantages are described in, and will be apparent from the following Detailed Description and the figures.

BRIEF DESCRIPTION OF THE DRAWINGS

Further features and advantages of the present disclosure will be evident from the description of the following, non-limiting embodiments with reference to the figures of the appended drawings, wherein.

DETAILED DESCRIPTION

Figure 1:
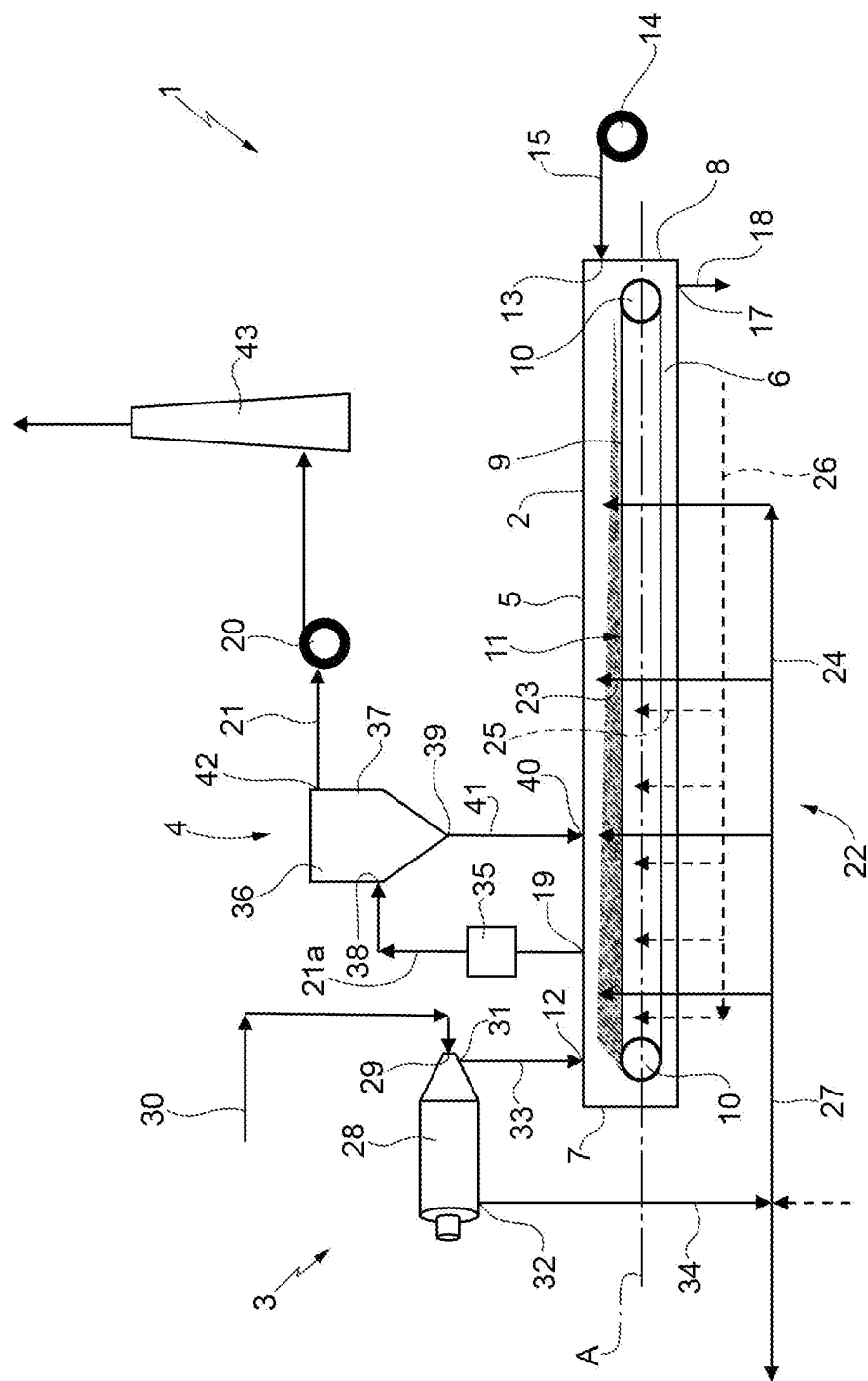
FIG. 1 is a schematic view of a first embodiment of a plant for the recovery of metals and/or metal oxides or residues from industrial process waste according to the disclosure.

Referring now to the example embodiments of the present disclosure illustrated in FIGS. 1 to 6, FIG. 1 shows in schematic form a plant and a method for recovering metals and/or metal oxides from industrial process waste, in particular waste produced when refining oil products (refinery waste).

For example, the waste to be treated in the plant 1 is ash resulting from gasification processes and contains in particular nickel oxides, vanadium and molybdenum.

In the embodiment in FIG. 1, the plant 1 makes it possible to recover from industrial waste a solid phase enriched in metals, mainly in the form of oxides; said oxides may then be sent to a subsequent separation step of the metals (described by way of example below).

The plant 1 mainly comprises a belt conveyor furnace 2, a pre-treatment unit 3 situated upstream of the belt conveyor furnace 2 along a path of waste to be treated, and a flue gas treatment group 4 which receives and processes the flue gases generated in the belt conveyor furnace 2.

The belt conveyor furnace 2 comprises a casing 5 provided with an inner chamber 6 and extending along a longitudinal axis A (essentially horizontal in use) between two opposite ends 7, 8; and a belt conveyor 9, housed in the chamber 6 and extending along the axis A. The belt conveyor 9 is closed in a loop and has a substantially horizontal configuration, being wrapped around at least two parallel end rollers 10, placed orthogonal to the axis A and substantially horizontal and placed at the ends 7, 8 of the furnace and which support and move the belt conveyor 9 (for simplicity, the drive system of the rotation of the rollers 10 is not shown).

Optionally, the belt conveyor 9 is also supported by additional intermediate rollers (not shown), placed between the end rollers 10.

In the example shown in FIG. 1 (and in the subsequent figures), the belt conveyor 9 rotates clockwise, so the belt conveyor has a top face 11, which receives the waste to be treated and conveys the waste along the axis A into the chamber 6 and moves from the end 7 towards the end 8.

The end 7 is provided with a main inlet 12 configured to feed the solid waste to be treated. The opposite end 8 is provided with a gas phase inlet 13, to feed the belt conveyor furnace 2, by a supply fan 14 mounted along a gas inlet line 15, with combustion air; and a solid phase outlet 17, connected to an outlet line 18 and from which the solid that has passed through the belt conveyor furnace 2 and which constitutes a solid phase enriched in metals (mainly in the form of oxides) is collected.

The belt conveyor furnace 2 is also fitted with a flue gas outlet 19 connected to the end 7 and through which the flue gases produced in the chamber 6 are removed from the belt conveyor furnace 2 by a suction fan 20 placed along a flue gas discharge line 21.

Advantageously, the belt conveyor furnace 2 is fitted with a temperature adjusting system 22, comprising a series of water or air cooling injectors 23, connected to a thermal moderating or quenching line 24, and/or series of burners 25, powered by a fuel line 26; the fuel line 26 and the burners 25 are also used to trigger, in the starting phase of the belt conveyor furnace 2, the combustion of the waste, and, if necessary, to support combustion during the normal running of the belt conveyor furnace 2.

If, as shown in FIG. 1, water is used to adjust the temperature in the belt conveyor furnace 2, the injectors 23 are water sprayers and the line 24 is connected to a hydraulic circuit 27.

The injectors 23 and the burners 25 are distributed along the longitudinal extension (length) of the belt conveyor furnace 2 and are thus axially spaced along the axis A. The injectors 23 and the burners 25 are controlled by a control unit (not shown) which acts on the injectors 23 and on the burners 25 to locally adjust the temperature in the belt conveyor furnace 2, even acting in a differentiated manner, if necessary, in different areas of the belt conveyor furnace 2.

The pre-treatment unit 3 is positioned upstream of the belt conveyor furnace 2 along a supply line 30 which supplies the waste to treat to the plant 1; and serves mainly to reduce the water content (moisture) of the waste which is then fed to the belt conveyor furnace 2, and is used in cases where the waste to be treated contains a significant amount of water such as waste coming from gasification processes, and therefore comprises at least one solid-liquid separation apparatus 28 or a dryer.

In the embodiment in FIG. 1, the pre-treatment unit 3 comprises in particular a centrifuge 28. As known, a centrifuge performs a separation of components with different densities, specifically separating a solid phase from a liquid phase. A centrifuge therefore has, typically, a fixed part, a part rotating at high speed and a helical screw.

The centrifuge 28 has an inlet 29, connected to a supply line 30 which supplies the waste to treat to the plant 1; and a solids outlet 31 and liquids outlet 32, set at respective opposite axial ends of the centrifuge 28. The solids outlet 31 is connected by an inlet line 33 to the main inlet 12 of the belt conveyor furnace 2; the liquids outlet 32 is connected to the hydraulic circuit 27 by a recirculation line 34 so as to reuse the water recovered from the pre-treatment unit 3. For example, the recovered water can be recycled to the industrial plant to which the plant 1 is associated (and from which the plant receives the waste to treat); and/or to the heat adjustment line 24 of the belt conveyor furnace 2.

The flue gas treatment group 4 is placed along the flue gas discharge line 21 and processes the flue gases coming from the belt conveyor furnace 2 before they are released into the atmosphere.

The flue gas treatment group 4 comprises for example a cooling unit 35 (heat exchanger, boiler, etc) and a filtration unit 36.

The filtration unit 36 comprises in particular an electrostatic precipitator 37 which separates solid particles from the flue gases (substantially ash particles) that may be present in the flue gas. The electrostatic precipitator 37 has a flue gas inlet 38 connected to the flue gas outlet 19 by a first section 21*a* of the flue gas discharge line 21; an ash outlet 39, connected to a secondary inlet of the belt conveyor furnace 2 via a secondary inlet line 41 to circulate to the belt conveyor furnace 2 the ash recovered from the flue gases; and a flue gas outlet 42 connected to a chimney 43.

The suction fan 20, which ensures the extraction of the flue gases from the chamber 6 of the belt conveyor furnace 2 and their circulation in the flue gas discharge line 21 and through the flue gas treatment group 4, is located along the flue gas discharge line 21, for example downstream of electrostatic precipitator 37.

In use, the industrial waste to be treated, in particular refinery waste (for example, coming from a gasification process), is first pre-treated in the pre-treatment unit 3, specifically in the centrifuge 28, to remove the water.

The recovered water is recycled to the hydraulic circuit 27. The solid waste, in the form of granules, flakes or powder, leaving the pre-treatment unit 3 is fed to the belt conveyor furnace 2 from the end 7 through the inlet 12; the solid waste falls onto the top face 11 of the belt conveyor 9 and is distributed along the entire width of the belt conveyor 9 (possibly by a mobile feeder transverse to the belt conveyor 9).

While the belt conveyor 9 moves in a loop around the end rollers 10, the solid waste is conveyed by the belt conveyor 9 along the chamber 6 (along a feed direction defined by the axis A).

The dimensional (such as length and width of the belt conveyor 9) and operational parameters (such as the speed of the belt conveyor 9 and time spent by the waste in the belt conveyor furnace 2) can be chosen as needed.

Merely for the purposes of illustration, the belt conveyor 9 moves for example at a speed to the order of 1 to 2 meters per minute; the belt conveyor furnace 2 is 20 to 60 meters long; the time spent by the waste in the furnace is greater than 10 minutes.

The combustion of the solid waste (especially of the carbonaceous component) takes place in the belt conveyor furnace 2.

At the moment of turning the belt conveyor furnace 2 on, it may be necessary to trigger the combustion of the waste, for example by the burners 25 fed by the fuel line 26; subsequently, when fully operational, the combustion of the waste is self-perpetuating, being the waste of combustible materials.

The combustion air and flue gases produced by the combustion of the waste inside the chamber 6 flow in countercurrent to the waste: while the waste moves (along with the belt conveyor 9) from the end 7 towards the end 8, air and flue gases move in the opposite direction, from the end 8 towards the end 7, from where they come out through the flue gas outlet 19.

In order to eliminate any dust settling in the lower part of the belt conveyor furnace 2, the belt conveyor 9 may be fitted with septums, spaced along the belt conveyor 9, which push the dust settling in the lower part of the belt conveyor furnace 2 to the end 7, where the dust can be collected and recycled on the belt conveyor 9.

In order to prevent the leakage of flue gases outside the belt conveyor furnace 2, the chamber 6 is kept in a slight vacuum by an appropriate balancing of the suction fan 20 and the supply fan 14.

In the area of the belt conveyor furnace 2 at the end 7, near the inlet 12 from where the solid waste to be treated enters, the drying and combustion of the lightweight components of the waste takes place; in the area at the opposite end 8, near the solid phase outlet 17, the cooling of the treated waste is performed by the incoming air. As a result, at the ends 7, 8 of the belt conveyor furnace 2 the temperature may be lower than the central area.

In the central area of the belt conveyor furnace 2 the combustion of the carbonaceous components of the waste takes place. In this area, the temperature tends to increase. In order to prevent the solid from agglomerating through the formation of low-melting eutectics and sublimating the metals with the possible formation of carbonyls, the temperature must be kept below 650° C., preferably below 600° C.

As a result, the belt conveyor 9 is made from a material, in particular a metal material having design temperatures of over 650° C., namely that is resistant to at least a temperature of 650° C.

Control of the average temperature in the central area of the belt conveyor furnace 2 is achieved by acting on the following parameters:

flow rate of the solid, and thus by changing the thickness of the solid on the belt conveyor 9;
flow rate of air, and thus by changing the speed of the gas phase inside the belt conveyor furnace 2;
belt conveyor speed, and thus by changing the time spent by the solid inside the belt conveyor furnace 2.

Temperature control along the length of belt conveyor furnace 2 is achieved by the temperature-adjusting system 22, which controls the intervention of the injectors 23 and/or burners 25.

The hot flue gases come out the flue gas outlet 19 and are sent to the flue gas treatment group 4 before being released into the atmosphere.

Appropriately, in the flue gas treatment group 4 the flue gases are cooled down to a temperature of 210°-350° C. and filtered to remove dust. Using an electrostatic filter (precipitator) in the filtration unit 36, it is possible to treat the flue gases at temperatures up to 350° C.; alternatively, a sleeve filter can be used, but in this case, the flue gases need to be cooled to temperatures around 220° C. (temperatures below 210° C. should be avoided because they tend to make the dust pack and clog the filter sleeves).

The metal oxides contained in the solid phase exiting from the belt conveyor furnace 2 are then treated to recover the metals, in particular by leaching and subsequent separation (for example, through precipitation and/or extraction).

Figure 2:
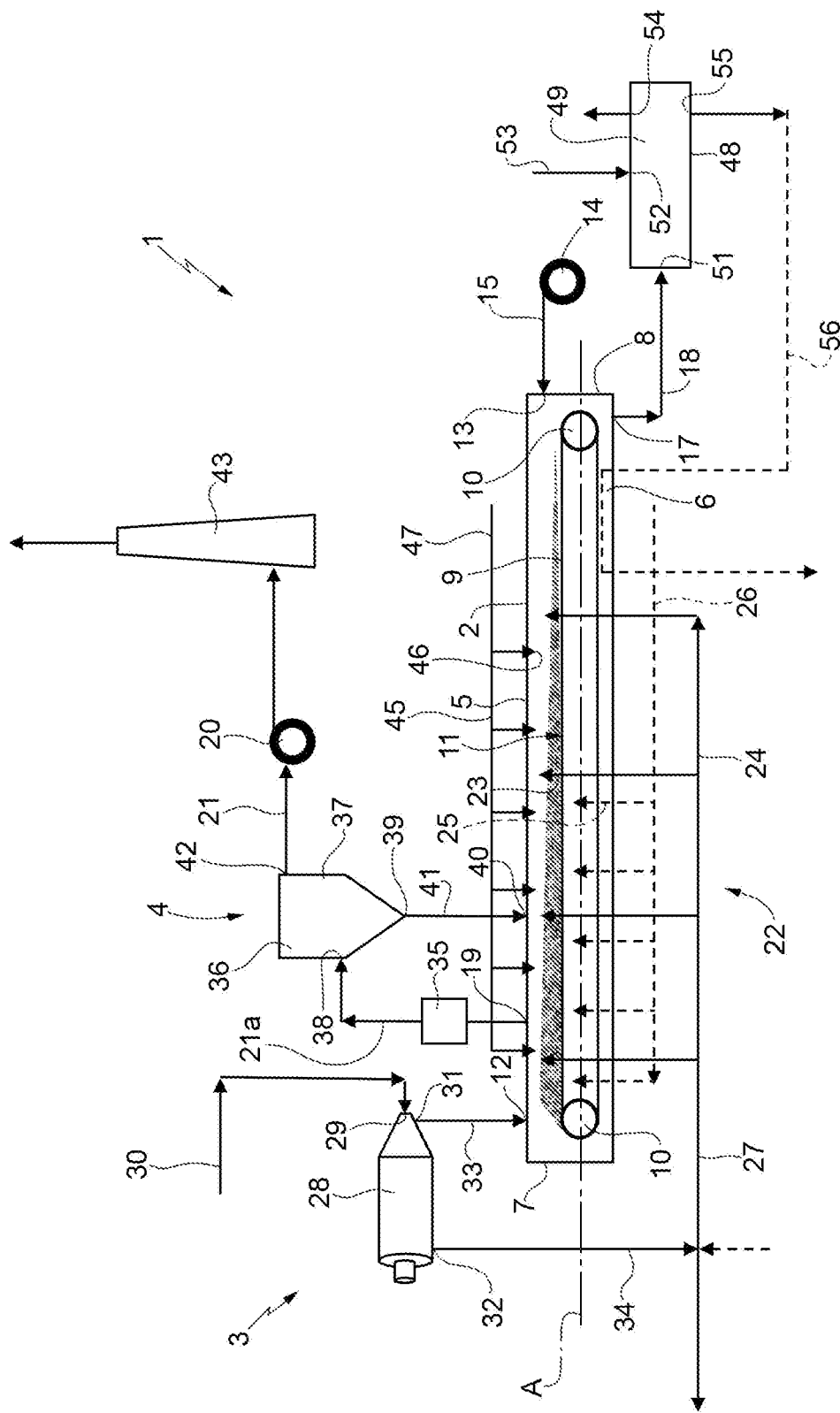
FIG. 2 is a schematic view of a second embodiment of the plant according to the disclosure.

According to one aspect of the disclosure, illustrated in FIG. 2, the belt conveyor furnace 2 is equipped with a chemical dispensing system 45, by which appropriate chemicals can be injected into the chamber 6, along the longitudinal extension of the belt conveyor furnace 2 and/or in predefined areas of the chamber 6.

In particular, in order to facilitate the subsequent leaching step, the chemical dispensing system is used to inject into the mass of solid waste advancing in the belt conveyor furnace 2 a solution of sodium carbonate (soda solvay).

Sodium carbonate reacts inside the belt conveyor furnace 2 with the vanadium oxides to produce sodium metavanadate and sodium pyrovanadate, and with the molybdenum oxides to produce sodium molybdate.

In more detail, the sodium carbonate reacts with molybdenum trioxide ($MoO_3$) to form sodium molybdate ($Na_2MoO_4$); and with vanadium pentoxide ($V_2O_5$) to form sodium metavanadate ($NaVO_3$) and subsequently pyrovanadate ($Na_4V_2O_7$).

Usually the reactions for the formation of sodium molybdate and sodium metavanadate, shown below, occur simultaneously:

$$Na_2CO_3 + MoO_3 \rightarrow Na_2MoO_4 + CO_2$$

$$Na_2CO_3 + V_2O_5 \rightarrow 2NaVO_3 + CO_2$$

The sodium molybdate ($Na_2MoO_4$) and sodium metavanadate ($NaVO_3$) can be easily and effectively recovered in solution using leaching with water, as described below.

The chemical dispensing system 45 comprises a series of nozzles 46 axially spaced (along the axis A) in the chamber 6 and connected to a chemical supply line 47. The nozzles 46 are, in certain embodiments, placed above the top face 11 of the belt conveyor 9.

The injection of sodium carbonate solution through the nozzles 46 axially spaced along the belt conveyor furnace 2 enables accurate control of the amount and distribution of sodium carbonate and thus of the sodium carbonate reactions with the vanadium oxides and molybdenum oxides.

Moreover, it is possible to change the injection of sodium carbonate solution along the axis A and along the length of the belt conveyor furnace 2 (i.e., inject differentiated quantities of solution in different areas of the belt conveyor furnace 2, in different positions along the axis A), as a function of the operating parameters such as temperature, speed of the belt conveyor, flow rate of the solid, and flow rate of the gaseous phase (flue gases) to maximize the formation of sodium molybdate and sodium metavanadate.

In the belt conveyor furnace 2, the injection of sodium carbonate solution does not entail problems of corrosion, because the materials of the belt conveyor furnace 2, particularly the material which the belt conveyor 9 is made of, are not subject to corrosion in the presence of sodium (as instead happens to the refractory materials used, for example, in multilevel rotary kilns, which sodium attacks and damages in depth).

The solid product exiting from the belt conveyor furnace 2 is sent to a recovery section 48, comprising in particular at least one leaching unit 49, where leaching with water takes place.

Leaching (or solid-liquid extraction) consists of the separation of one or more soluble components from a solid mass by a solvent.

In the process of the disclosure, the solvent is water and the solid phase entering the leaching unit 49 is a mixture mainly of sodium molybdate (Na2MoO4) and sodium metavanadate (NaVO3), which have been formed in the belt conveyor furnace 2 thanks to the injection of calcium carbonate, and nickel oxide (NiO).

From the leaching unit 49 a solution of sodium molybdate (Na2MoO4) and sodium metavanadate (NaVO3), and a solid containing primarily nickel oxide are obtained.

The leaching 49 has an inlet 51 connected by the outlet line 18 to the solid phase outlet 17 of the belt conveyor furnace 2 to feed the solid phase to the leaching unit 49; a water supply inlet 52 connected to a water supply line 53 to supply water to the leaching unit 49; a head outlet 54 from which an aqueous solution containing the recovered metals, in particular vanadium and molybdenum comes out; and a bottom outlet 55, from which a solid phase containing the oxides of nickel and other metals not recovered, comes out.

Leaching is conducted for example at temperatures between 60° C. and 100° C., with residence times to the order of 3 hours. To keep the solution warm, it is possible to take advantage of the warmth of the solid phase exiting from the belt conveyor furnace 2, sending the solid phase coming out of the furnace (at temperatures over 100° C.) directly to the leaching unit 49.

After leaching with water, most of the molybdenum and vanadium is found in solution as sodium metavanadate and sodium molybdate, whereas the oxides of nickel and other metals are found in the solid phase with a higher concentration than the solid entering the leaching unit 49.

The solid phase containing nickel oxide and oxides of other metals exiting from the leaching unit 49 may possibly be brought inside the belt conveyor furnace 2 by a drying line 56 which branches off the bottom outlet 55 of the leaching unit 49, to be dried in a section of the belt conveyor furnace 2, as shown schematically in FIG. 2.

Since the concentration of nickel in the solid phase downstream of leaching is relatively much greater than the normal concentration in minerals from mines, the solid product exiting from the plant 1 is suitable to be processed for the extraction or recovery of nickel.

The injection of sodium carbonate solution in the belt conveyor furnace 2 to increase the subsequent extraction of vanadium and molybdenum in leaching may be higher than the stoichiometric amount, in which case the excess will be found in the liquid solution exiting from the leaching unit 49. If there is a large excess of sodium carbonate, it is possible to recycle part of the solution in the belt conveyor furnace 2.

The sodium molybdate (Na2MoO4) and sodium metavanadate (NaVO3) solution can be used in various processes for the recovery of molybdenum and vanadium (recovering vanadium and molybdenum in quantities exceeding 80% and even higher than 90% of the content initially present in the waste treated in the plant), such as:
1. fractional precipitation of ammonium molybdate and ammonium metavanadate;
2. fractional precipitation of molybdenum and molybdenum disulphide salts (MoS$_3$) with H$_2$S;
3. fractional precipitation of sodium metavanadate (NaVO$_3$), adding ammonium salts and by solvent extraction, for example containing amino groups.

These processes can be easily conducted in situ, downstream of the leaching step, thus in the same plant 1.

Figure 3:
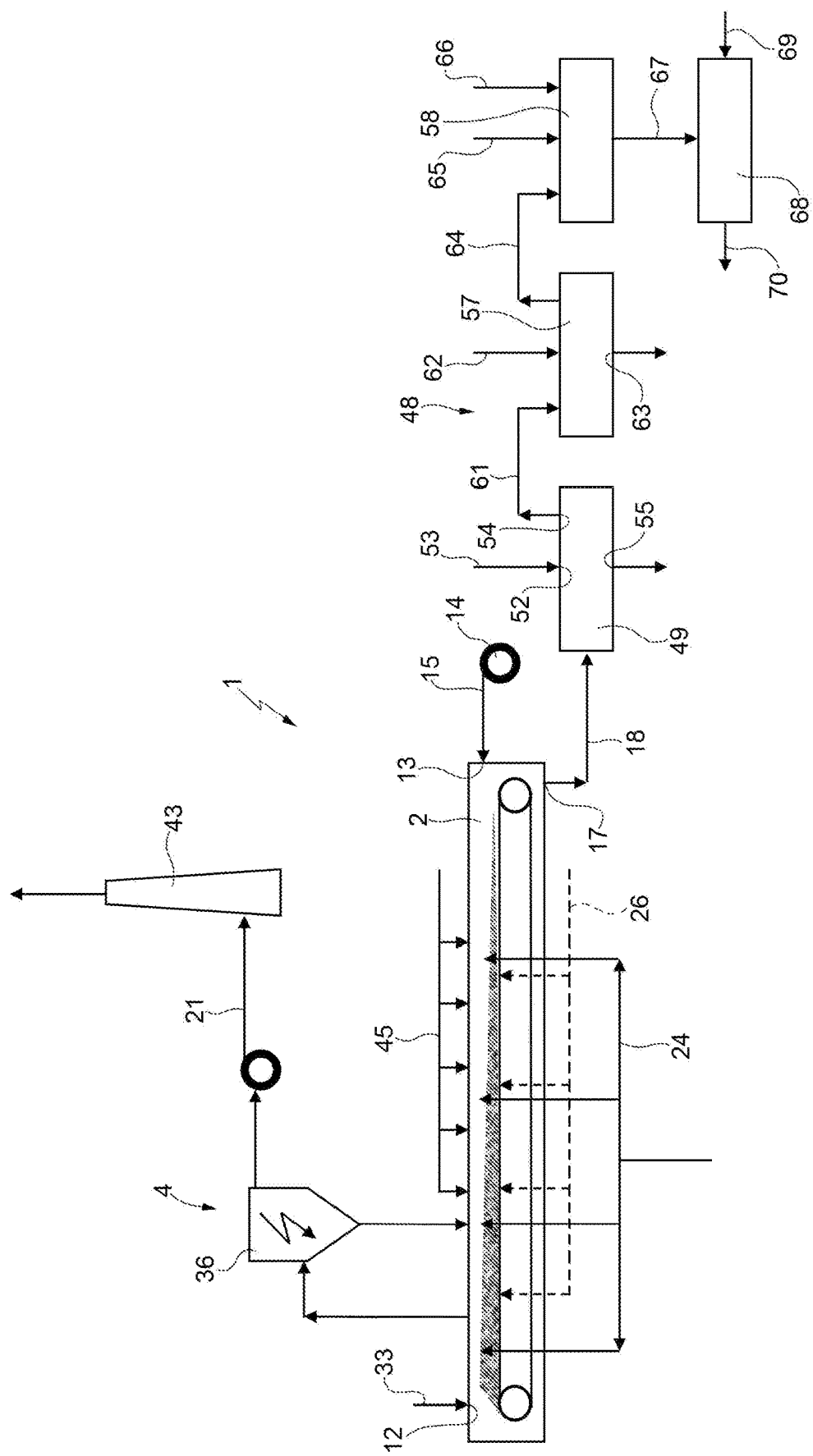
FIGS. 3 to 6 are schematic views of further embodiments of the plant according to the disclosure.

FIG. 3 shows schematically one embodiment for the recovery of molybdenum and vanadium downstream of the leaching.

As described earlier, in the belt conveyor furnace 2 sodium molybdate and sodium metavanadate are formed as a result of the injection of sodium carbonate through the chemical dispensing system 45. The solid phase exiting from the belt conveyor furnace 2 and containing sodium molybdate and sodium metavanadate is sent to the recovery section 48.

The recovery section 48 includes the leaching unit 49, where sodium molybdate and sodium metavanadate pass into solution, and one or more units 57, 58 separating the metals, where vanadium and molybdenum are separated and recovered.

In particular, the solution of sodium molybdate and sodium metavanadate exiting from the leaching unit 49 is sent first, through a first connection line 61 which branches off the head outlet 54, to a vanadium precipitation unit 57 to which ammonium sulphate is fed through an inlet line 62 and where the vanadium is recovered by precipitation of ammonium metavanadate with ammonium sulphate in an alkaline environment (pH greater than 8).

The reaction to obtain the fractional precipitation of ammonium metavanadate at an alkaline pH is as follows:

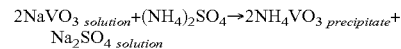
$$2NaVO_3\ _{solution} + (NH_4)_2SO_4 \rightarrow 2NH_4VO_3\ _{precipitate} + Na_2SO_4\ _{solution}$$

From the vanadium precipitation unit 57 a precipitate of ammonium metavanadate is obtained which is discharged from a bottom outlet 63 of the unit 57; and a solution containing a reduced amount of ammonium metavanadate ammonium molybdate.

This solution is sent, via a second connection line 64, to a molybdenum precipitation or extraction unit 58 for the recovery of molybdenum. The recovery step of molybdenum from the solution may be performed by different known processes, such as:
fractional precipitation of the ammonium molybdate by changing the acidity of the solution (for example with sulphuric acid until an acid pH of about 1÷2) using ammonium salts (such as ammonium sulphate), according to the reaction:

$$Na_2MoO_4\ _{solution} + (NH_4)_2SO_4 \rightarrow (NH_4)_2MoO_4\ _{precipitate} + Na_2SO_4\ _{solution}$$

fractional precipitation of the molybdenum disulphide (MoS$_3$) formed by the molybdate reacted with hydrogen sulphide (H$_2$S), according to the reaction:

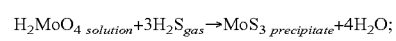
$$H_2MoO_4\ _{solution} + 3H_2S\ _{gas} \rightarrow MoS_3\ _{precipitate} + 4H_2O;$$

solvent extraction, for example containing amino groups (trioctyl/dodecyl amine, Alamine 336; tri-n-Octyl amine, TOA; tri-n-dodecyl amine, Alamine 304, quaternary ammonium salts) or otherwise such as hydroxydecan-7-6-diethyl-5.8-oxime (LIX 63).

In the embodiment of FIG. 3, for example, the molybdenum precipitation unit 58 is fed through respective reactant inlet lines 65, 66 with ammonium sulphate and sulphuric acid, resulting in a precipitate of ammonium molybdate.

The precipitate of ammonium molybdate is sent via a further connection line 67 to a saponification unit 68, where the precipitate is treated with organic carboxyl acids, acids fed via an acids inlet line 69 to form a molybdenum soap.

The acids generally used are naphthenic acids; oxalic acids can be used as a promoter of the saponification reaction; saponification is conducted indicatively at around 100° to 300° C., preferably 200-250° C., for about 5 to 12 hours.

A molybdenum soap is obtained from the saponification (generally Mo-napthtenate) with a softening point around 120° C. and a molybdenum content of 4 to 7%, preferably 6%.

The soap obtained, discharged from an outlet 70, is suitable for use in the hydroconversion processes of refining by-products with slurry technology conducted with catalysts, as a catalyst precursor, (i.e., molybdenum disulphide (MoS2)). The soap is soluble in the charge used in these processes forming a homogeneous solution of molybdenum; inside the reactors used in this technology, the molybdenum reacts with H2S and hydrogen forming molybdenum sulphide (MoS2) which acts as a catalyst.

The plant 1 and the process implemented therein as described above may be variously modified, also depending on the type of industrial waste to be treated.

For example, the pre-treatment unit 3 might not be needed, if the waste to be treated is dry enough.

The pre-treatment unit 3 may include, instead of a centrifuge as described above, a different type of solid-liquid separation apparatus, or a dryer.

Figure 4:
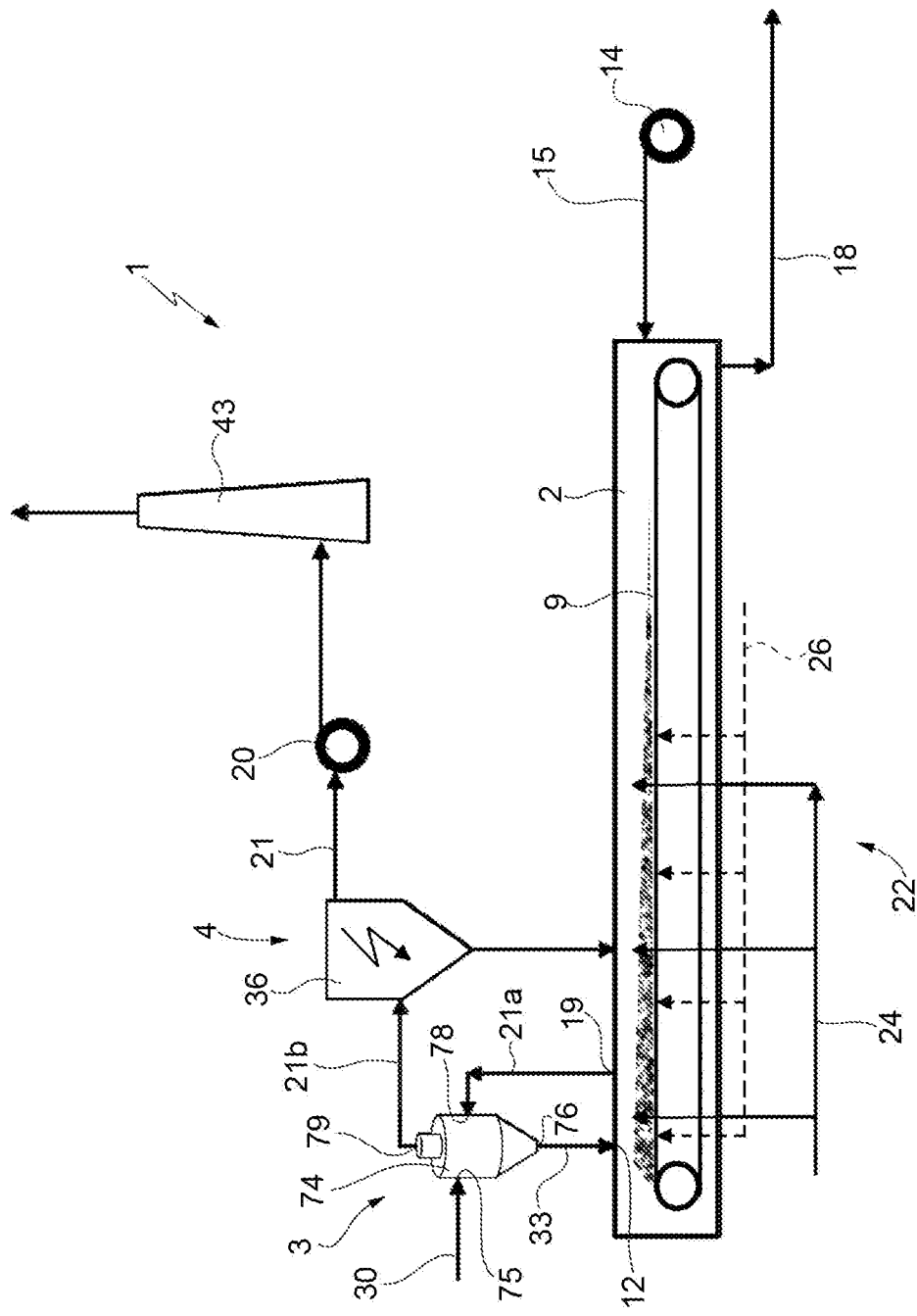

For example, in the embodiment of FIG. 4, indicated for the treatment of waste from gasification, the pre-treatment unit 3 includes a dryer 74, in particular a cyclone dryer.

The cyclone dryer 74 also permits the direct discharge of the dried product onto the belt conveyor 9 of the belt conveyor furnace 2; in addition it is possible to use part of the hot flue gases coming from the belt conveyor furnace 2 in the cyclone dryer 74, reducing the use of fuel required for drying.

The dryer 74 therefore has an inlet 75, connected to the supply line 30 which conveys the waste to be treated into the plant 1; a solids outlet 76, connected via the inlet line 33 to the inlet 12 of the belt conveyor furnace 2; a flue gas inlet 78, connected to the flue gas outlet 19 of the belt conveyor furnace 2 by the first section 21a of the flue gas discharge line 21; a gas outlet 79, connected to a second portion 21b of the flue gas discharge line 21 and thus to the flue gas treatment group 4.

The gases exiting from the dryer 74 are then sent and filtered in the flue gas treatment group 4 along with the flue gases coming from the belt conveyor furnace 2.

It should be appreciated that the plant 1 of FIG. 4 may also include the chemical dispensing system 45 and recovery section 48 (not shown in FIG. 4).

Figure 5:
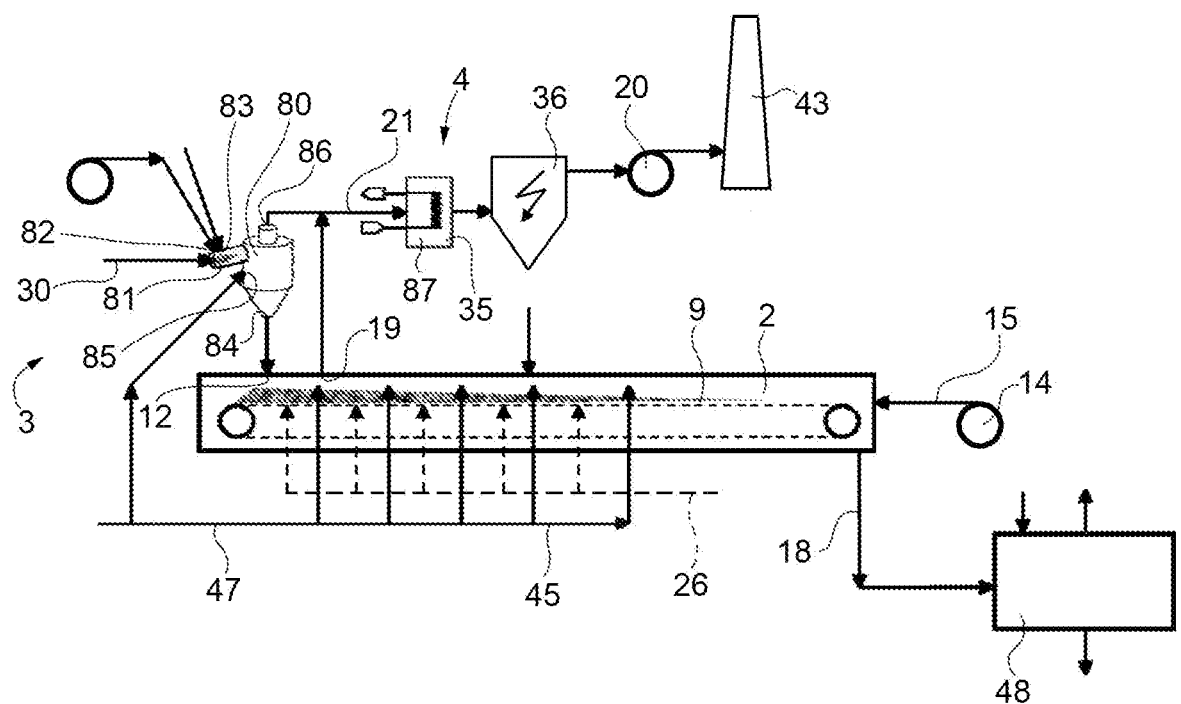

FIG. 5 illustrates an embodiment suitable in particular to treat waste containing a significant amount of light hydrocarbons, such as waste from hydroconversion processes with slurry technology of heavy refinery waste (EST-type ENI Slurry Technology).

In this embodiment, the pre-treatment unit 3 includes a combustor 80, in particular a cyclone combustor, which is fed with the waste to be treated.

The combustor 80 thus has an inlet 81 connected to supply line 30 which conveys the waste to be treated into the plant 1; an air inlet 82 to introduce combustion air; a steam inlet 83 to introduce, optionally, steam and/or water; a solids outlet 84, connected via the inlet line 33 to the inlet 12 of the belt conveyor furnace 2 to discharge on the belt conveyor 9 the dust produced in the combustor 80; a service inlet 85, connected to the chemical dispensing system 45 (in particular via a branch of the chemical supply line 47) to introduce the chemicals in the waste to be treated, already in the pre-treatment unit 3; a flue gases outlet 86, connected to the flue gas discharge line 21 and thus to the flue gas treatment group 4.

The temperature in the combustor 80 may be controlled, as well as by adjusting the airflow entering the combustor 80, also by adjusting the supply of steam and water.

The flue gases exiting from the combustor 80 may be treated in the flue gas treatment group 4 to be purified together with the flue gases coming from the belt conveyor furnace 2, using the same filtration unit 36.

In case it is intended to recover the heat generated in the combustor 80, as well as from the flue gases coming from the belt conveyor furnace 2, the flue gases treatment group 4 may include a single boiler 87, which constitutes the cooling unit 35 and is placed upstream of the filtration unit 36 to enable the heat recovery from the flue gases coming from both the combustor 80 and from the belt conveyor furnace 2.

The injection of chemicals is particularly advantageous in cases where the waste to be treated contains significant amounts of sulphur, so that an abatement of the sulphur compounds is appropriate.

By injecting sodium carbonate using the chemical dispensing system 45, directly in the pre-treatment unit 3 and/or the belt conveyor furnace 2, it is possible to reduce the SO2/SO3. The sodium carbonate reactions with sulphur compounds produce sodium sulphates/sulphites and possible salts mixed with vanadium, which are found in the oxides exiting from the belt conveyor furnace 2. Such products facilitate the leaching of vanadium and molybdenum, therefore the presence of sulphur in the process according to the disclosure brings benefits, while in the most widely used processes of the prior art the presence of sulphur is generally a problem.

Figure 6:
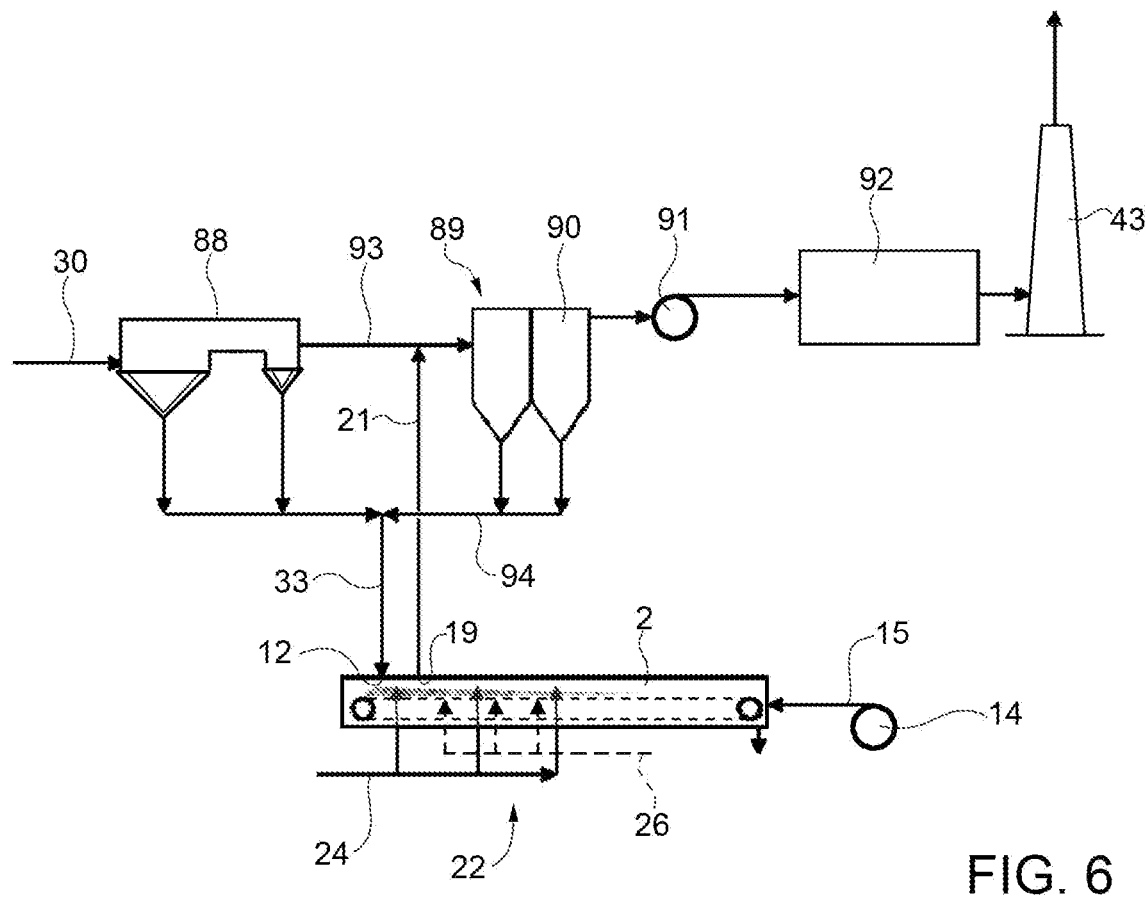

FIG. 6 illustrates an embodiment shown in particular for treating waste coming from a combustion process or system, such as combustion ash of pet coke or refinery waste.

In this case, the waste to be treated in the plant 1 consists of ash discharged by a boiler 88 where pet coke and/or refinery waste is burnt.

The flue gas treatment group 4 is integrated in a ventilation-filtration-purification system 89 of the flue gases coming from the boiler 88 and essentially comprises a filter 90, in particular an electrostatic filter, one or more fans 91 and a purification device 92, in particular a desulphurisation (FGD, Flue Gas Desulphurization) device.

The combustion ash from the boiler 88 is sent to the belt conveyor furnace 2 via the inlet line 33 and the inlet 12; the combustion flue gases produced in the boiler 88 are sent to the filter 90 connected to the boiler 88 by a flue gas line 93 which the flue gas discharge line 21 of the belt conveyor furnace 2 also joins; the filter 90 thus processes both the flue gases of the boiler 88 and the flue gases of the belt conveyor furnace 2, mixed together; the ash retrieved from the filter 90 is recycled to the belt conveyor furnace 2 via a recycling line 94 flowing into the inlet line 33 and thus together with ash coming directly from the boiler 88; the flue gases exiting from the filter 90 are sent to the purification device 92 and then discharged into the atmosphere from the chimney 43.

Lastly, it is understood that numerous modifications and variations may be made to the plant and to the process described and illustrated while remaining within the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for recovering at least one of a metal and a metal oxide from industrial process waste, said method comprising:
spreading a solid waste on a top face of a belt conveyor closed in a loop with a substantially horizontal configuration along an axis,
advancing the belt conveyor along the axis to move the solid waste lying on the belt conveyor along an advance direction defined by the axis while supplying heat to the solid waste to induce a combustion of the solid waste to reduce a carbon content of said solid waste and produce a metal enriched solid phase,
responsive to a determination of a first temperature of the combustion of the solid waste, increasing the first temperature of the combustion of the solid waste by a series of burners axially spaced apart from one another along the axis,
responsive to a determination of a second temperature of the combustion of the solid waste, decreasing the second temperature of the combustion of the solid waste by at least one of:
a series of injectors of cooling water axially spaced apart from one another along the axis, wherein at least one burner of the series of burners is positioned between at least two injectors of cooling water of the series of injectors of cooling water, and
a series of injectors of air axially spaced apart from one another along the axis, wherein the at least one burner of the series of burners is positioned between at least two injectors of air of the series of injectors of air,
removing, from the face of the belt conveyor, the metals enriched solid phase, and
extracting metals from said metals enriched solid phase.

2. The method of claim 1, further comprising:
supplying at least one of: combustion air and combustion gas to assist the combustion of the solid waste, and
removing flue gas produced by the combustion of the solid waste, wherein the combustion air and the flue gas are circulated in a counter-current direction from the advance direction of the solid waste.

3. The method of claim 1, further comprising pre-treating the solid waste by removing water from the solid waste before the combustion of the solid waste to reduce a water content of the solid waste.

4. The method of claim 3, wherein the pre-treatment includes one of: separating a solid-liquid, and drying.

5. The method of claim 3, wherein the pre-treatment is performed by a centrifuge.

6. The method of claim 1, wherein the belt conveyor is made of a material resistant to a temperature of at least 650° C.

7. The method of claim 1, further comprising spreading, by a series of nozzles axially spaced along the axis, one or more chemicals to at least one of: in a chamber of the belt conveyor, on the solid waste lying on the belt conveyor longitudinally along the axis, and in at least one predetermined zone of the chamber of the belt conveyor.

8. The method of claim 7, wherein a solution of sodium carbonate is injected for forming sodium salts of the metal contained in the solid waste.

9. The method of claim 8, further wherein the solid waste to treat contains molybdenum, nickel and at least one pnictogen and the injection of sodium carbonate results in the formation of sodium molybdate and sodium metavanadate.

10. The method of claim 9, further comprising leaching, with water, of the solid phase removed from the belt conveyor to produce a solution of sodium molybdate and sodium metavanadate, and a solid containing nickel oxide.

11. The method of claim 10, further comprising, after the leaching, at least partially separating the metal contained in the solution obtained from the leaching.

12. The method of claim 11, wherein the at least partially separated metal comprises vanadium and molybdenum.

13. The method of claim 1, wherein the industrial process waste comprises oil product refining waste.

14. A method for recovering at least one of a metal and a metal oxide from industrial process waste, said method comprising:
spreading a solid waste on a top face of a belt conveyor closed in a loop with a substantially horizontal configuration along an axis,
advancing the belt conveyor along the axis to move the solid waste lying on the belt conveyor along an advance direction defined by the axis while supplying heat to the solid waste to induce a combustion of the solid waste to reduce a carbon content of said solid waste and produce a metal enriched solid phase,
at each of a plurality of different areas associated with the belt conveyor, locally adjusting a temperature of the combustion of the solid waste, wherein the temperature at a first area associated with the belt conveyor is adjustable by a first configuration of at least one of: a series of injectors of cooling water axially spaced apart from one another along the axis, a series of injectors of air axially spaced apart from one another along the axis, and a series of burners axially spaced apart from one another along the axis, wherein at least one of: at least one burner of the series of burners is positioned between at least two injectors of cooling water of the series of injectors of cooling water, and the at least one burner of the series of burners is positioned between at least two injectors of air of the series of injectors of air, and the temperature at a second, different area associated with the belt conveyor is adjustable by a second, different configuration of at least one of: the series of injectors of cooling water axially spaced apart from one another along the axis, the series of injectors of air axially spaced apart from one another along the axis, and the series of burners axially spaced apart from one another along the axis,
removing, from the face of the belt conveyor, the metals enriched solid phase, and
extracting metals from said metals enriched solid phase.

15. The method of claim 14, further comprising:
supplying at least one of: combustion air and combustion gas to assist the combustion of the solid waste, and
removing flue gas produced by the combustion of the solid waste, wherein the combustion air and the flue gas are circulated in a counter-current direction from the advance direction of the solid waste.

16. The method of claim 14, further comprising pre-treating the solid waste by removing water from the solid waste before the combustion of the solid waste to reduce a water content of the solid waste.

17. The method of claim 16, wherein the pre-treatment includes one of: separating a solid-liquid, and drying.

18. The method of claim 16, wherein the pre-treatment is performed by a centrifuge.

19. The method of claim 14, wherein the flue gas is filtered by one of: an electrostatic precipitator and a filter.

20. The method of claim 14, further comprising cooling the flue gas before the flue gas is filtered.

21. The method of claim 14, wherein the belt conveyor is made of a material resistant to a temperature of at least 650° C.

22. The method of claim 14, further comprising spreading, by a series of nozzles axially spaced along the axis, one or more chemicals to at least one of: in a chamber of the belt conveyor, on the solid waste lying on the belt conveyor longitudinally along the axis, and in at least one predetermined zone of the chamber of the belt conveyor.

23. The method of claim 22, wherein a solution of sodium carbonate is injected for forming sodium salts of the metal contained in the solid waste.

24. The method of claim 23, further wherein the solid waste to treat contains molybdenum, nickel and at least one pnictogen and the injection of sodium carbonate results in the formation of sodium molybdate and sodium metavanadate.

25. The method of claim 24, further comprising leaching, with water, of the solid phase removed from the belt conveyor to produce a solution of sodium molybdate and sodium metavanadate, and a solid containing nickel oxide.

26. The method of claim 25, further comprising, after the leaching, at least partially separating the metal contained in the solution obtained from the leaching.

27. The method of claim 26, wherein the at least partially separated metal comprises vanadium and molybdenum.

28. The method of claim 14, wherein the industrial process waste comprises oil product refining waste.

\* \* \* \* \*